Dec. 14, 1965    J. W. HENNEMAN    3,222,932
PRESSURE RESPONSIVE INSTRUMENT
Filed March 19, 1963    3 Sheets-Sheet 1
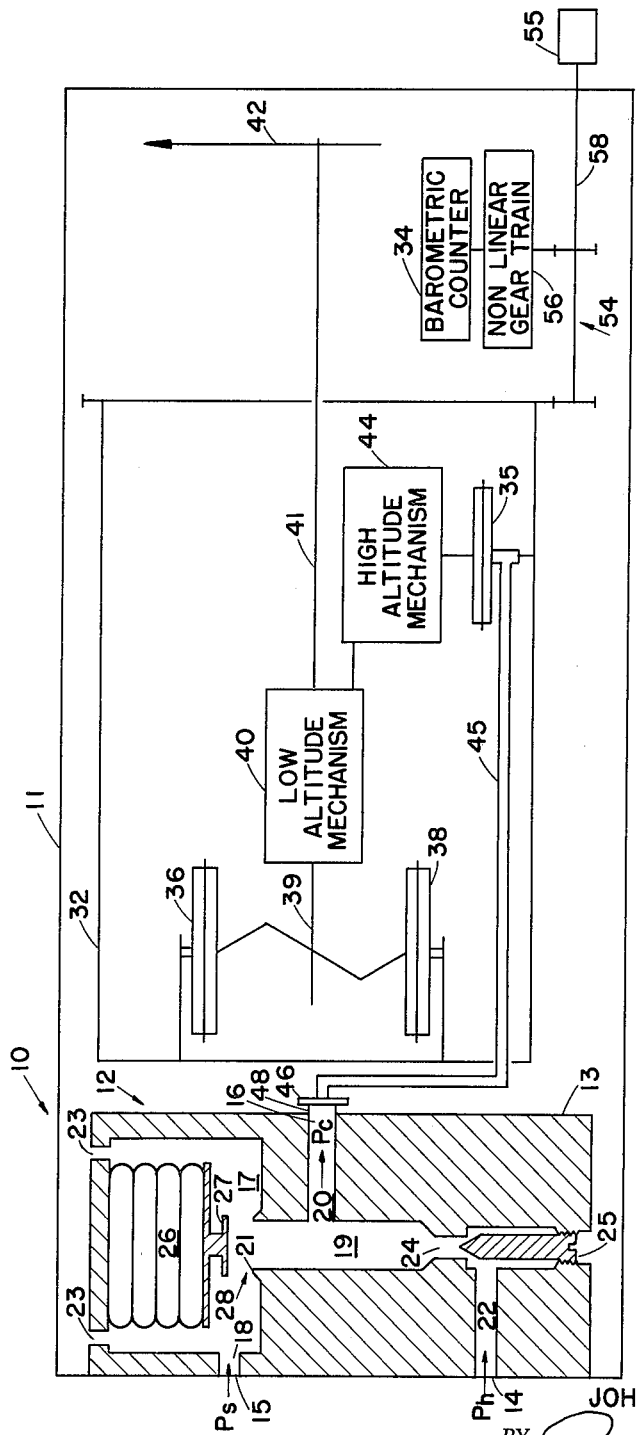
FIG. I
INVENTOR.
JOHN W. HENNEMAN
BY Roger W. Nolan Jr
ATTORNEY

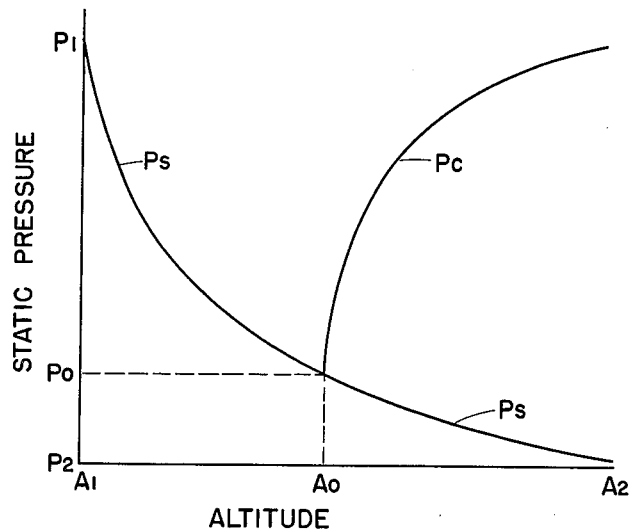
FIG. II
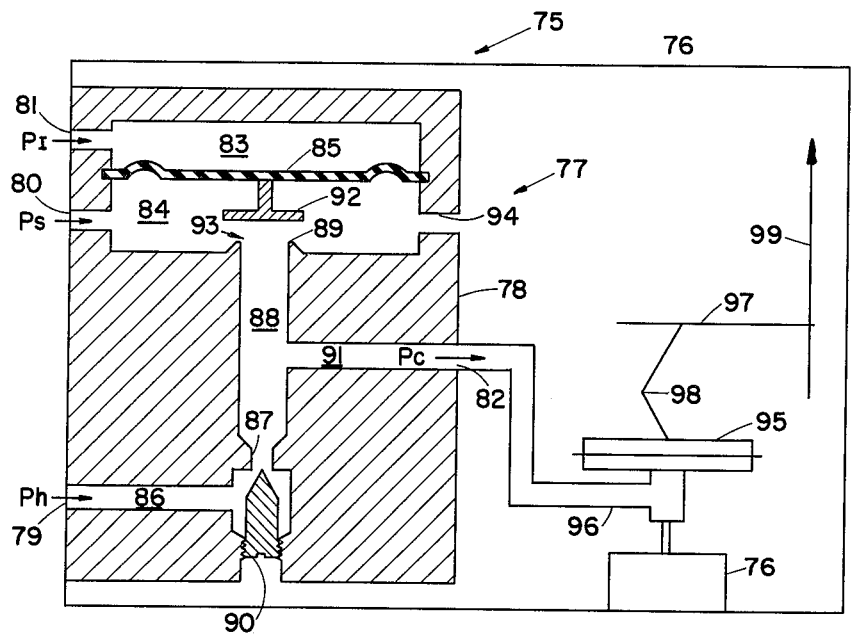
FIG. III

Dec. 14, 1965   J. W. HENNEMAN   3,222,932
PRESSURE RESPONSIVE INSTRUMENT
Filed March 19, 1963   3 Sheets-Sheet 3
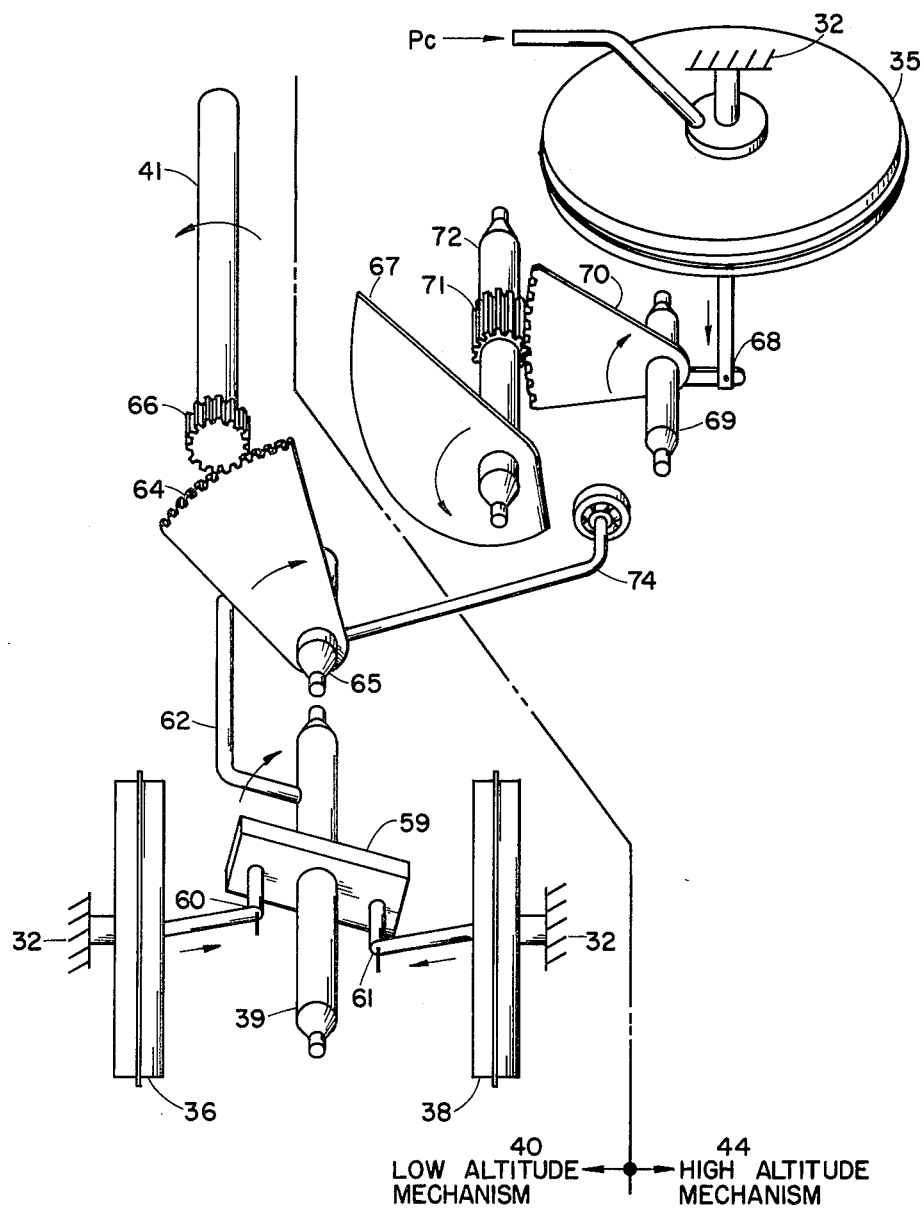
FIG. IV
INVENTOR.
JOHN W. HENNEMAN
BY Roger W Nolan Jr
ATTORNEY

United States Patent Office 3,222,932
Patented Dec. 14, 1965

3,222,932
PRESSURE RESPONSIVE INSTRUMENT
John W. Henneman, Rock Island, Ill., assignor to The Bendix Corporation, Davenport, Iowa, a corporation of Delaware
Filed Mar. 19, 1963, Ser. No. 266,397
9 Claims. (Cl. 73—386)

This invention relates to pressure responsive instruments and more particularly to instruments utilizing pressure multiplication apparatus for producing signals representative of flight conditions.

Present instruments which are used to indicate various flight conditions have the disadvantage of being incapable to indicate accurately under low pressure conditions. This same limitation on accuracy may also be present under high pressure conditions where extremely high accuracy is required. The optimum accuracy is not possible in these pressure measuring devices because of hysteresis in the pressure responsive means used, and because of friction which is present in the mechanism which is used for indicating the pressure condition. Present apparatus which is used to accurately indicate these pressure conditions includes complicated electrical means which are costly and unduly complex.

An object of the present invention is to provide a pneumatic-mechanical apparatus for accurately producing signals representative of flight conditions.

The invention will be more completely understood when applied to a specified field of application and will be more clearly illustrated when described in the altimeter field. It is to be understood that the present invention may be utilized in rate of ascent or descent indicators, airspeed indicators, and other pressure sensing and indicating instruments. Present mechanical altimeters are not accurate at high altitudes because the change in ambient pressure for a significant altitude change is small. The pressure sensing capsule presents hysteresis problems and the instrument friction limits the use of the altimeter to at most 80,000 feet of altitude. A pneumatic-mechanical altimeter which would give an accurate indication at high altitudes would require a capsule sensing element so large as to make its use impractical.

Another object of the present invention is to provide pneumatic-mechanical apparatus which employs the principle of multiplication for producing signals representative of flight conditions.

A further object of the present invention is to provide an altimeter which multiplies ambient pressure by a fixed ratio over a predetermined pressure range and can be used effectively to accurately indicate altitude to 150,000 feet or higher.

A still further object of the present invention is to provide an airspeed indicator which utilizes the principle of pressure multiplication for accurately sensing and indicating airspeed over a predetermined range.

A still further object of the present invention is to provide an altimeter having good sensitivity in the high altitude ranges which is small, light weight, and inexpensive.

Certain of these objects are realized in the invention by the provision of a first transducer responsive to an actuating pressure for producing a signal variable as a function of flight condition, means for providing said actuating pressure comprising a flow passage, a valve and a second pressure transducer, said second transducer responsive to changes in said flight condition for actuating said valve and controlling the fluid pressure in said flow passage. In addition, certain of these objects are realized in the invention by the provision of a pressure multiplication means, static pressure responsive elements, a control pressure responsive element in fluid communication with said means, and means for continuously indicating a flight condition in response to static pressure variations as sensed by said static pressure element and said pressure multiplication means.

The foregoing and other objects and advantages of the invention will appear more fully hereinafter from a consideration of the detailed description which follows, taken together with the accompanying drawings, wherein an embodiment of the invention is illustrated. It is to be expressly understood, however, that the drawings are for the purpose of illustration and description and are not to be construed as defining the limits of the invention.

FIGURE I of the drawing is a schematic drawing of a pneumatic-mechanical altimeter including pressure multiplication apparatus;

FIGURE II is a graphic illustration of the advantages of employing the pressure multiplication principle in apparatus designed for sensing altitude;

FIGURE III is a schematic showing of a pneumatic-mechanical airspeed indicator including pressure multiplication apparatus; and FIGURE IV is a pictorial presentation of the low altitude and high altitude mechanism illustrated in block form in FIGURE I.

In the following detailed description and operational description, numerical values for pressure, altitude, and flow rates will be used to more clearly illustrate the present invention as used in the novel altimeter described. These values should not be considered as limiting the scope of the invention because other values may be used.

Referring now to the drawings and in particular to FIGURE I, there is shown an altimeter 10 having a housing 11. Within housing 11 is pressure multiplier 12 having a housing 13 which defines supply port 14, static port 15 and control port 16.

Housing 13 defines aneroid chamber 17 which is in fluid communication with static port 15 by means of passageway 18 and in fluid communication with control port 16 by means of control chamber 19 and passageway 20. The interior of altimeter housing 11 is in fluid communication with control chamber 19 by means of ports 23. Control chamber 19 has one end thereof defining valve seat 21 which opens into aneroid chamber 17. Supply port 14 is in fluid communication with control chamber 19 by means of passageways 22 and 24. Adjusting screw 25 is disposed for movement in housing 13 for restricting the flow of fluid into passageway 24. Aneroid 26 having valve head 27 mounted thereon is disposed in aneroid chamber 17 for movement toward and away from valve seat 21.

The altimeter shown in FIGURE I will provide a continuous indication to 150,000 feet altitude and higher. Present altimeters of this basic construction will provide satisfactory indication of approximately 80,000 feet altitude, an altimeter of this construction may be found in patent application Serial Number 91,386 filed February 2, 1961 in the name of Carl E. Johanson and assigned to the assignee of the present invention.

All the elements of the altimeter 10 are enclosed in the pressure-tight housing 11, the interior of housing 11 is subjected to absolute static pressure, $P_s$, as heretofore described. Housing 11 has cage member 32 disposed therein and mounted by any well known means for rotation relative to the housing 11.

A dial face (not shown) is in a fixed position relative to the housing 11 having markings thereon for indicating altitude. Barometric counter 34 is viewed through the dial face and indicates a preset barometric pressure in inches of mercury.

Differential pressure capsule 35 and static pressure responsive capsules 36 and 38 are mounted on cage member 32. Shaft 39 is connected to capsules 36 and 38 and pivotally mounted (not shown) at one end in cage member 32 and the second end is connected to low altitude mechanism 40. Output shaft 41 from low altitude mechanism 40 passes through cage member 32 and is connected to pointer 42. High altitude mechanism 44 is connected to differential pressure capsule 35 and low altitude mechanism 40.

The interior of differential pressure capsule 35 is in fluid communication with pressure multiplier 12 by means of tubing 45, flexible connection 46, and tubing 48. Flexible connection 46 may advantageously be of the type disclosed in patent application Serial Number 91,386, filed February 2, 1961 in the name of Carl E. Johanson, assigned to the assignee of the present invention.

Altimeter 10 includes a barometric pressure compensating mechanism 54 comprising adjusting knob 55, non-linear gear train 56, barometric counter 34 and rotating cage member 32. Adjusting knob 55 through shaft 58, non-linear gear train 56 rotates counter 34 which indicates barometric pressure in inches of mercury. A corresponding rotation of cage member 32 is accomplished through shaft 58. The rotation of cage 32 imparts rotation to shaft 41 and pointer 42 which elements will indicate the incremental increase or decrease in feet of altitude corresponding to the increase or decrease in barometric pressure indicated in inches of mercury on counter 34. Barometric pressure compensation mechanisms of the type described are found in more detail in patent application Serial Number 183,575 filed March 29, 1962 in the name of Carl E. Johanson and assigned to the assignee of the present invention.

The low altitude mechanism 40 and high altitude mechanism 44 are shown in more detail in FIGURE IV. In FIGURE IV the arrows indicate the movement of the mechanism with increasing altitude. Static pressure responsive capsules 36 and 38 are connected to mounting member 59 of shaft 39 by means of linkage 60 and 61, respectively. In low altitude mechanism 40 a low altitude driver 62 is fixed in shaft 39 and drives sector gear 64 which is mounted on shaft 65. Sector gear 64 meshes with pointer gear 66 which is mounted on output shaft 41.

Low altitude mechanism 40 operates over a range of altitudes up to a predetermined level at which point high altitude mechanism 44 drives the output shaft 41. Differential pressure capsule 35 is pressurized internally from the control pressure ($Pc$) of pressure multiplier 10 as heretofore described. Capsule 35 is connected to cam 67 of high altitude mechanism 44 by means of linkage 68, shaft 69, sector gear 70, pinion gear 71, and cam shaft 72. The control pressure $Pc$ begins to rise above the static pressure, $Ps$ at said predetermined level. The initial deflection of the capsule 35 and the connecting linkage positions cam 67 against follower 74 which is mounted on shaft 65 of the low altitude mechanism 40.

With reference to FIGURE I, the pressure multiplication may be further illustrated as follows:

$Ps$ represents absolute static pressure (shown at static port 15).

$Pc$ represents control pressure (shown at control port 16).

$Ph$ represents the pressure of the supply gas (shown at supply port 14).

$Aa$ represents the effective area of aneroid 26.

$Av$ represents the effective area of the valve 28 (valve head 27 and valve seat 21).

$Po$ represents the predetermined absolute static pressure at which aneroid 26 begins operation.

With the above figures the following equation may be written:

$$(Po - Ps)A = (Pc - Ps)Av$$

$$(Pc - Ps) = \frac{Aa}{Av}(P_o - Ps)$$

If a pressure responsive instrument is designed so that $(Po - Ps)$ is the pressure for operation, then the pressure change $(Pc - Ps)$ is a direct function of the ratio of the area of the aneroid to the area of the valve $Aa/Av$. The multiplication factor for the pressure multiplier 12 can be constructed to provide any desired multiplication ratio by the design of the valve seat 28 and aneroid 26.

Referring now to FIGURE II, there is shown a static pressure-altitude graph which illustrates the advantage of the pressure multiplication principle as used with a standard mechanical type altimeter. As altitude increases from A1 to A2 the static pressure decreases from P1 to P2, this relationship is represented by curve $Ps$. The control pressure, $Pc$, follows the absolute static pressure, $Ps$, until pressure $Po$ is reached. As $Ps$ decreases (higher altitude) $Pc$ increases as shown in FIGURE II. The slope of the curve $Pc$ is greater than the slope of the curve $Ps$ as a function of the multiplication factor $Aa/Av$. Advantageously in an altimeter a differential pressure capsule may be utilized to control the instrument above a predetermined altitude, $Ao$, and thus is subjected to the control pressure, $Pc$, internally and externally to the static pressure $Ps$. Therefore, the deflection of the capsule, and thus the altitude indication, is a function of $(Pc - Ps)$.

In operation of the altimeter 10 shown in FIGURE I with the high and low altitude mechanisms of FIGURE IV the interior of housing 11 is open to the static pressure line of the air vehicle by means of static port 15, passageway 18, chamber 17, and ports 23 and supply port 14 is open to a gas pressure source, preferably a source having a minimum pressure of 50 p.s.i.g. For the purpose of the operational description, an altitude of 80,000 feet will be used as the predetermined altitude heretofore discussed.

Gas from supply 14 will flow through passageway 22, past adjusting screw 25, through passageway 24, and into control chamber 19. The flow past screw 25 is restricted so that a constant flow per minute is maintained. The gas bleed for the pressure multiplier 12 is minute and flows in the area of 10 cubic centimeters per minute will give good response rates. Below an altitude of 80,000 feet the gas flows past adjusting screw 25 and unrestricted through multiplier 12 and into the interior of housing 11. This small bleed into the static system of the altimeter 10 does not adversely affect its normal operation.

Below 80,000 feet altitude changes in the altitude of the air vehicle and thus changes in the static pressure inside the housing 11 is sensed by the static pressure responsive capsules 36 and 38. The deflection of the capsules 36 and 38 is translated to the pointer 42 by means of shaft 39, low altitude mechanism 40 and output shaft 41 and thus static pressure is indicated on the dial face (not shown) in feet of altitude. In the low altitude mechanism 40 (FIG. IV) shaft 39 drives low altitude driver 62 against sector gear 64 which meshes with pointer gear 66 mounted on output shaft 41.

Above 80,000 feet altitude, pressure multiplier 12 provides a control pressure, $Pc$, which increases as the static pressure, $Ps$, decreases. In pressure multiplier 12 aneroid 26 begins to create a control pressure, $Pc$, at control port 15 at approximately 80,000 feet of altitude, by means of valve head 27 (FIG. I) metering the gas flow past valve seat 21. This control pressure, $Pc$, is transmitted to differential pressure capsule 35 by means of tubing 48, flexible connection 46 and tubing 45. The control pressure, $Pc$, begins to rise above static pressure, $Ps$, at approximately 80,000 feet altitude. This small differential pressure $(Pc - Ps)$ causes an initial deflection of the capsule 35 and positions the cam 67 (FIG. IV) of high altitude mechanism 44 against follower 74 (FIG. IV) of low altitude mechanism 40. At altitude above 80,000 feet, increasing differential pressure $(Pc - Ps)$ causes further displacement of the capsule 35 and the cam 67 (FIG. IV) drives the sector 64 (FIG. IV) as a function of altitude. The deflection of capsules 36 and 38 is small above 80,000 feet of altitude and the sector gear 64 (FIG. IV) over-runs the low altitude driver 62 (FIG. IV). The control pressure, $Pc$, at port 16 is a function of the pressure change $(Po - Ps)$ in static pressure from the pretermined value (pressure equivalent to 80,000 feet altitude) and the ratio of the effective area of the aneroid 26 (A$a$) to the effective area of the valve 28 (A$v$).

As heretofore stated, pressure multiplication principle may advantageously be employed in many types of pressure sensitive instruments. A second type of instrument is shown in FIGURE III wherein an airspeed indicator is shown, such an instrument is required where high accuracy is required in the low speed range, a helicopter may advantageously use this type of airspeed indicator. The impact pressure, P$i$, is relatively small at low airspeeds and thus the friction of present instrument and the hysteresis of the pressure sensitive capsule prevent reliable accuracy.

Referring in particular to FIGURE III there is shown an airspeed indicator 75 having a housing 76. Within housing 76 is a pressure multiplier 77 having a housing 78 which defines supply port 79, static port 80, impact port 81, and control port 82.

Multiplier housing 78 defines an upper diaphragm chamber 83 and lower diaphragm chamber 84, resilient diaphragm 85 forms a common wall for the chamber 83 and 84. Upper diaphragm chamber 83 is in fluid communication with impact port 81 and lower diaphragm chamber 84 is in fluid communication with static port 80. Supply port 79 is in fluid communication with lower chamber 84 by means of passageways 86 and 87 and control chamber 88. Control chamber 88 has one end thereof defining valve seat 89 which opens into lower diaphragm chamber 84. Adjusting screw 90 is disposed for movement in housing 78 for restricting the flow of fluid into passageway 87. Control chamber 88 is in fluid communication with control port 82 by means of passageway 91. Resilient diaphragm 85 has valve head 92 mounted thereon for movement toward and away from valve seat 89. Valve 93 comprises valve seat 89 and valve head 92.

All of the elements of the airspeed indicator 75 are enclosed in the housing 76. The interior of housing 76 is subjected to static pressure, P$s$, by means of static port 80, chamber 84, and passage port 94. A dial face (not shown) is in a fixed position relative to the airspeed. Differential pressure capsule 95 is mounted on the housing 76 and is in fluid communication with control port 92 by means of tubing 96. Output shaft 97 is connected to capsule 95 by means of linkage 98 and is pivotally mounted (not shown) at one end in the housing 76 and the second end is connected to airspeed pointer 99.

In operation of the airspeed indicator 75 shown in FIGURE III the interior of the housing 76 is open to the static pressure, P$s$, line of the air vehicle by means of static port 80, chamber 84 and passage port 94, upper diaphragm chamber 83 is open to the impact pressure, P$i$, line of the air vehicle by means of impact port 81 and supply port 79 is open to a gas pressure source, preferably a source having a minimum pressure of 50 p.s.i.g. Upon movement of the air vehicle, a differential pressure ($Pi-Ps$) is created across resilient diaphragm 85. It is readily seen that diaphragm 85 may be any one of a wide variety of pressure sensitive members including an aneroid 26 (FIG. I) as utilized in the altimeter of FIG. I wherein impact pressure, P$i$, would be transmitted to the interior of the capsule and static pressure, P$s$, would be exterior of the capsule. The following pressure equation may be written for the airspeed indicator 75:

$$(Pc-Ps) = \frac{Ad}{Av}(Pi-Ps)$$

Thus, having ($Pi-Ps$) the pressure for operation, the pressure change ($Pc-Ps$) is a direct function of the ratio of the effective area of the diaphragm (A$d$) to the effective area of the valve (A$v$).

Gas from supply port 79 will flow through passageway 86, past adjusting screw 90, through passageway 87 and into control chamber 88. The flow past screw 90 is restricted so that a constant flow per minute is maintained. The gas bleed for the pressure multiplier 77 is minute and flows in the area of 10 cubic centimeters per minute will give good response rates. Upon movement of the air vehicle the sensed impact pressure, P$i$, in upper diaphragm chamber 83 begins to create a control pressure, P$c$, at the control port 82 by means of diaphragm 85 moving valve head 92 thereby metering the gas flow past valve seat 89. This control pressure, P$c$, is transmitted to differential pressure capsule 95 as heretofore described. The differential pressure ($Pc-Ps$) causes deflection of the capsule 95 which movement is transmitted to pointer 99 by means of linkage 98 and shaft 97, thereby indicating airspeed on the dial face (not shown). The output pressure, P$c$, at port 82, is a function of the pressure change ($Pi-Ps$) and the ratio of the effective area of the diaphragm (A$d$) to the effective area of the valve (A$v$).

Airspeed indicator 75 as illustrated in FIGURE III is adaptable for low airspeed uses. It is readily seen that within the purview of the invention apparatus may be designed so that airspeed indication may be accomplished over a wide range. Apparatus of this type may include mechanisms similar to that illustrated in FIGURES I and IV wherein a high speed mechanism would operate independent of the low speed mechanism shown in FIGURE III.

While the pressure responsive apparatus as shown in the drawings is of the construction shown and described, it is understood that the instant invention is not limited to any particular form or construction. Moreover, other changes and modifications of the novel pressure responsive apparatus contemplated herein may be made by those skilled in the art without departing from the scope of the instant invention.

I claim:

1. A pressure sensitive flight condition indicator for producing a signal variable as a multiple of a flight condition the state of which is represented by a first pressure comprising a pressure sensitive capsule means responsive to a second pressure for producing an output signal variable in proportion to said second pressure according to said multiple of a flight condition, means for subjecting said capsule to said second pressure variable as a multiple of said first pressure comprising a pressure source, a conduit connecting said source and said capsule, valve means for maintaining said second pressure in said conduit, a pressure to mechanical displacement transducer means for actuating said valve, means for subjecting said transducer to said first pressure, the pressure change of said second pressure less said first pressure maintained as a direct function of the ratio of the effective area of said transducer to the effective area of said valve.

2. A pressure sensitive flight condition indicator for producing a signal variable as a multiple of a variable flight condition comprising a pressure sensitive member, pressure passage means for communicating fluid pressure to said pressure sensitive member, means for varying the fluid pressure in said pressure passage means as a function of said variable flight pressure condition comprising a flow passage in fluid communication with said pressure passage means and having a passage opening, flow restricting means disposed in said flow passage for limiting the flow of a pressurized fluid through said flow passage, and means for relieving the fluid from said flow passage including a fluid chamber open to said variable flight pressure condition, a resilient pressure responsive member disposed in said chamber and valve means actuated by said pressure responsive member and disposed for varying said passage opening, said last mentioned means maintaining the pressure change of the fluid pressure in said pressure passage less said variable pressure a function of the ratio of the effective area of the pressure responsive member to the effective area of said valve means.

3. In an altimeter means for producing a signal variable as a multiple of static pressure comprising a pressure sensitive capsule means responsive to actuating pressure for producing an output signal variable in proportion to said actuating pressure according to said multiple of said static pressure, means for subjecting said capsule to said actuating pressure as a multiple of said static pressure comprising a pressure source, a conduit connecting said source and said capsule, valve means for maintaining said actuating pressure, a pressure to mechanical displacement transducer means for actuating said valve, means for subjecting said transducer to said static pressure, the pressure change of said actuating pressure less said static pressure maintained as a direct function of the ratio of the effective area of said transducer to the effective area of said valve.

4. In an altimeter means for producing a signal variable as a multiple of static pressure comprising a pressure sensitive capsule, a pressure passage means for communicating fluid pressure to said pressure sensitive capsule, means for varying the fluid pressure in said pressure passage means as a function of said static pressure comprising a flow passage in fluid communication with said pressure passage means and having a passage opening, flow restricting means disposed in said flow passage for limiting the flow of a pressurized fluid through said flow passage, and means for relieving the fluid from said flow passage including a fluid chamber open to said static pressure, a resilient pressure responsive member disposed in said chamber and valve means actuated by said pressure responsive member and disposed for varying said passage opening, said last mentioned means maintaining the pressure change of the fluid pressure in said pressure passage less said static pressure a function of the ratio of the effective area of the pressure responsive member to the effective area of the valve.

5. An instrument for indicating altitude wherein multiplication of static pressure is utilized above a predetermined altitude comprising a housing having a static pressure inlet and a source pressure inlet, a dial fixed relative to said housing, a pointer movable relative to said dial, an aneroid, a shaft connected to said pointer, linkage means interconnecting said aneroid and said shaft for rotating said shaft as a function of the expansion of said aneroid, a control pressure responsive capsule, means connecting said capsule and said shaft and for rotation of said shaft independent of said aneroid above said predetermined altitude, static pressure multiplication means comprising a flow passage in fluid communication with said source pressure inlet and having a passage opening, flow restricting means disposed in said flow passage for limiting the flow of a pressurized fluid therethrough, said capsule in fluid communication with said flow passage intermediate said restricting means and said passage opening, and means for controlling the fluid flow from said flow passage above said predetermined altitude comprising a fluid chamber open to said static pressure, an evacuated aneroid disposed in said chamber, and valve means actuated by said evacuated aneroid and disposed for varying said passage opening, said last mentioned means maintaining the control pressure in said capsule a function of the difference between the pressure equivalent to said predetermined altitude less said static pressure as multiplied by the ratio of the effective area of said evacuated aneroid to the effective area of said valve means.

6. An instrument for indicating altitude wherein multiplication of static pressure is utilized above a predetermined altitude comprising a housing having a static pressure inlet and a source pressure inlet, a dial fixed relative to said housing, a pointer movable relative to said dial, an aneroid, a shaft connected to said pointer, means interconnecting said aneroid and said shaft for rotating said shaft as a function of the expansion of said aneroid comprising gear means disposed for rotationally driving said shaft, linkage means connected to said aneroid for driving said gear means, a control pressure responsive capsule, means connecting said capsule and said gear means comprising a cam, linkage means interconnecting said capsule and said cam, said cam disposed to drive said gear means independent of said aneroid above said predetermined altitude, static pressure multiplication means comprising a flow passage in fluid communication with said source pressure inlet and having a passage opening, flow restricting means disposed in said flow passage for limiting the flow of a pressurized fluid therethrough, said capsule in fluid communication with said flow passage intermediate said restricting means and said passage opening, and means for controlling the fluid flow from said flow passage above said predetermined altitude comprising a fluid chamber to open to said static pressure, an evacuated aneroid disposed in said chamber, and valve means actuated by said evacuated aneroid and disposed for varying said passage opening, said last mentioned means maintaining the control pressure in said capsule a function of the difference between the pressure equivalent to said predetermined altitude less said static pressure as multiplied by the ratio of the effective area of said evacuated aneroid to the effective area of said valve means.

7. In an airspeed indicator means for producing a signal variable as a multiple of impact pressure comprising a pressure sensitive capsule means responsive to actuating pressure for producing an output signal variable in proportion to said actuating pressure according to said multiple of impact pressure, means for subjecting said capsule to said actuating pressure as a multiple of said impact pressure comprising a pressure source, a conduit connecting said source and said capsule, valve means for maintaining said actuating pressure, a pressure to mechanical displacement transducer means for actuating said valve, means for subjecting said transducer to said impact pressure, the pressure change of said actuating pressure less said impact pressure maintained as a direct function of the ratio of the effective area of said transducer to the effective area of said valve.

8. In an airspeed indicator means for producing a signal variable as a multiple of impact pressure comprising a pressure sensitive capsule, pressure passage means for communicating fluid pressure to said pressure sensitive capsule, means for varying the fluid pressure in said pressure passage means as a function of said impact pressure comprising a flow passage in fluid communication with said pressure passage means and having a passage opening, flow restricting means disposed in said flow passage for limiting the flow of a pressurized fluid through said flow passage, and means for relieving the fluid flow from said flow passage including a fluid chamber open to said impact pressure, a resilient pressure responsive member disposed in said chamber and valve means actuated by said pressure responsive member and disposed for varying said passage opening, said last mentioned means maintaining the pressure change of the fluid pressure in said pressure passage less said impact pressure a function of the ratio of the effective area of the pressure responsive member to the effective area of said valve means.

9. An instrument for indicating airspeed wherein multiplication of impact pressure is utilized for producing a signal variable as a multiple of said impact pressure comprising, a housing having an impact pressure inlet, a static pressure inlet and a source pressure inlet, a dial face fixed to said housing, a pointer movable relative to said dial, a control pressure responsive capsule means for producing said signal, a shaft connected to said pointer, linkage means interconnecting said aneroid and said shaft for rotating said shaft as a function of the expansion of said capsule, impact pressure multiplication means comprising a flow passage in fluid communication with said source pressure inlet and having a passage opening, flow restricting means disposed in said flow passage for limiting the flow of a pressurized fluid therethrough, said capsule in fluid communication with said flow passage intermediate said restricting means and said passage opening, and means for controlling the flow from said flow passage comprising a fluid chamber open to said impact pressure inlet and said static pressure inlet, a resilient member disposed across the interior of said chamber and dividing said chamber into two chambers, one of said chambers open to said impact pressure inlet and the second of said chambers open to said static pressure inlet and said passage opening, and valve means actuated by said resilient member and disposed for varying said passage opening, said valve means maintaining the control pressure in said capsule a function of the difference between said impact pressure less said static pressure as multiplied by the ratio of the effective area of said resilient member to the effective area of said valve means.

References Cited by the Examiner

UNITED STATES PATENTS 2,743,608   5/1956   Hunter _____ 73—182
3,050,996   8/1962   Henderson _____ 73—182

DAVID SCHONBERG, *Acting Primary Examiner.*

LOUIS R. PRINCE, *Examiner.*

D. O. WOODIEL, *Assistant Examiner.*